US010157354B2

(12) United States Patent
Durg et al.

(10) Patent No.: US 10,157,354 B2
(45) Date of Patent: Dec. 18, 2018

(54) LOCATION SPECIFIC CONTENT DELIVERY

(71) Applicant: Accenture Global Services Limited, Dublin (IE)

(72) Inventors: Kishore Prabhakar Durg, Bangalore (IN); Niraj Gupta, Bangalore (IN); Ramkumar Kothandaraman, Bangalore (IN); Amit Bahree, Bellevue, WA (US)

(73) Assignee: Accenture Global Services Limited, Dublin (IE)

( * ) Notice: Subject to any disclaimer, the term of this patent is extended or adjusted under 35 U.S.C. 154(b) by 1063 days.

(21) Appl. No.: 14/471,964

(22) Filed: Aug. 28, 2014

(65) Prior Publication Data

US 2016/0063428 A1 Mar. 3, 2016

(51) Int. Cl.
*G06F 15/16* (2006.01)
*G06Q 10/06* (2012.01)
*H04L 29/08* (2006.01)

(52) U.S. Cl.
CPC ...... *G06Q 10/063114* (2013.01); *H04L 67/18* (2013.01); *H04L 67/306* (2013.01)

(58) Field of Classification Search
CPC ............ G06Q 10/063114; H04L 67/18; H04L 67/306
USPC ......................................... 709/202–203, 250
See application file for complete search history.

(56) References Cited

U.S. PATENT DOCUMENTS

| 6,957,393 | B2 | 10/2005 | Fano et al. | |
| 7,079,850 | B2 | 7/2006 | Cameron | |
| 8,582,481 | B2 * | 11/2013 | Kim | H04W 84/22 455/436 |
| 9,118,897 | B2 * | 8/2015 | Wiegand | H04N 13/111 |
| 2014/0070919 | A1 * | 3/2014 | Jackson | H04L 67/125 340/5.61 |
| 2014/0106735 | A1 * | 4/2014 | Jackson | H04W 8/245 455/419 |
| 2015/0036050 | A1 * | 2/2015 | Huang | H04N 5/45 348/568 |
| 2015/0304484 | A1 * | 10/2015 | Halmstad | H04M 1/72577 455/419 |
| 2016/0112757 | A1 * | 4/2016 | Pan | H04L 67/42 709/203 |

* cited by examiner

*Primary Examiner* — Bharat Barot
(74) *Attorney, Agent, or Firm* — Brinks Gilson & Lione

(57) ABSTRACT

An intelligent information delivery system facilitates dynamic interaction with the user's environment, and in certain environments may provide or support digital governance. The intelligent delivery system may make use of a distributed beacon network to accurately determine the user's location within an environment, which may then be leveraged to deliver relevant content to the user. The intelligent delivery system may also facilitate complex interactions between a user of the system and the user's environment.

14 Claims, 10 Drawing Sheets

LOCATION SPECIFIC CONTENT DELIVERY

TECHNICAL FIELD

This disclosure relates to a system architecture for targeted delivery of relevant information based on spatial location.

BACKGROUND

The delivery of relevant content is often a significant challenge. The number of different target devices, the wide diversity in interested parties, and the immense amount of potential content creates an enormous space to navigate in terms of providing the proper content to the proper target device at the proper time. The exponential increase in the number of target devices (e.g., smartphones, tablet computers, and other portable devices) that are carried every day in almost every environment will continue to make delivery of relevant content a difficult challenge to meet.

DETAILED DESCRIPTION

Figure 1A:
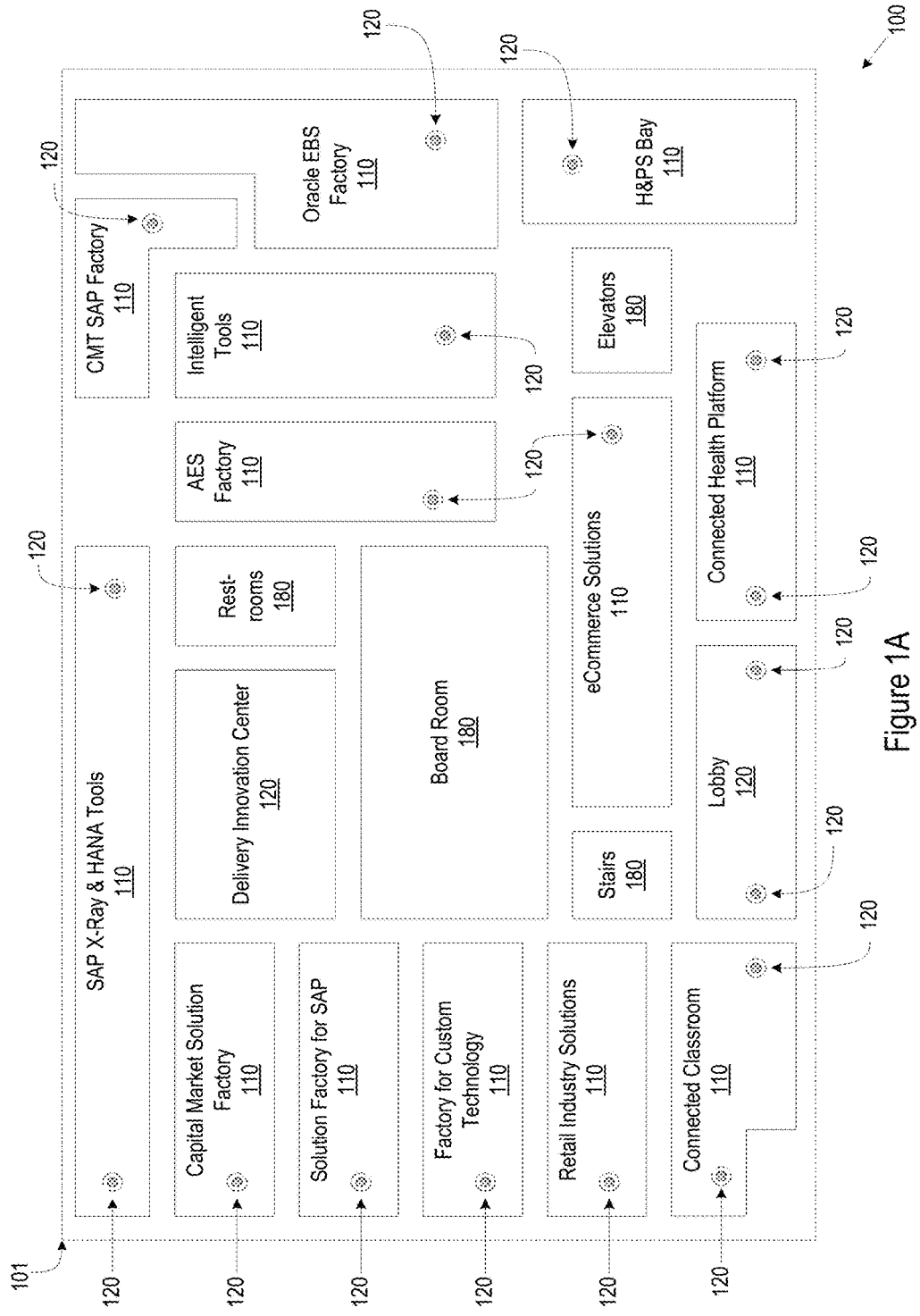
FIG. 1A provides an example operating environment in which the current system may be employed.
Figure 1B:
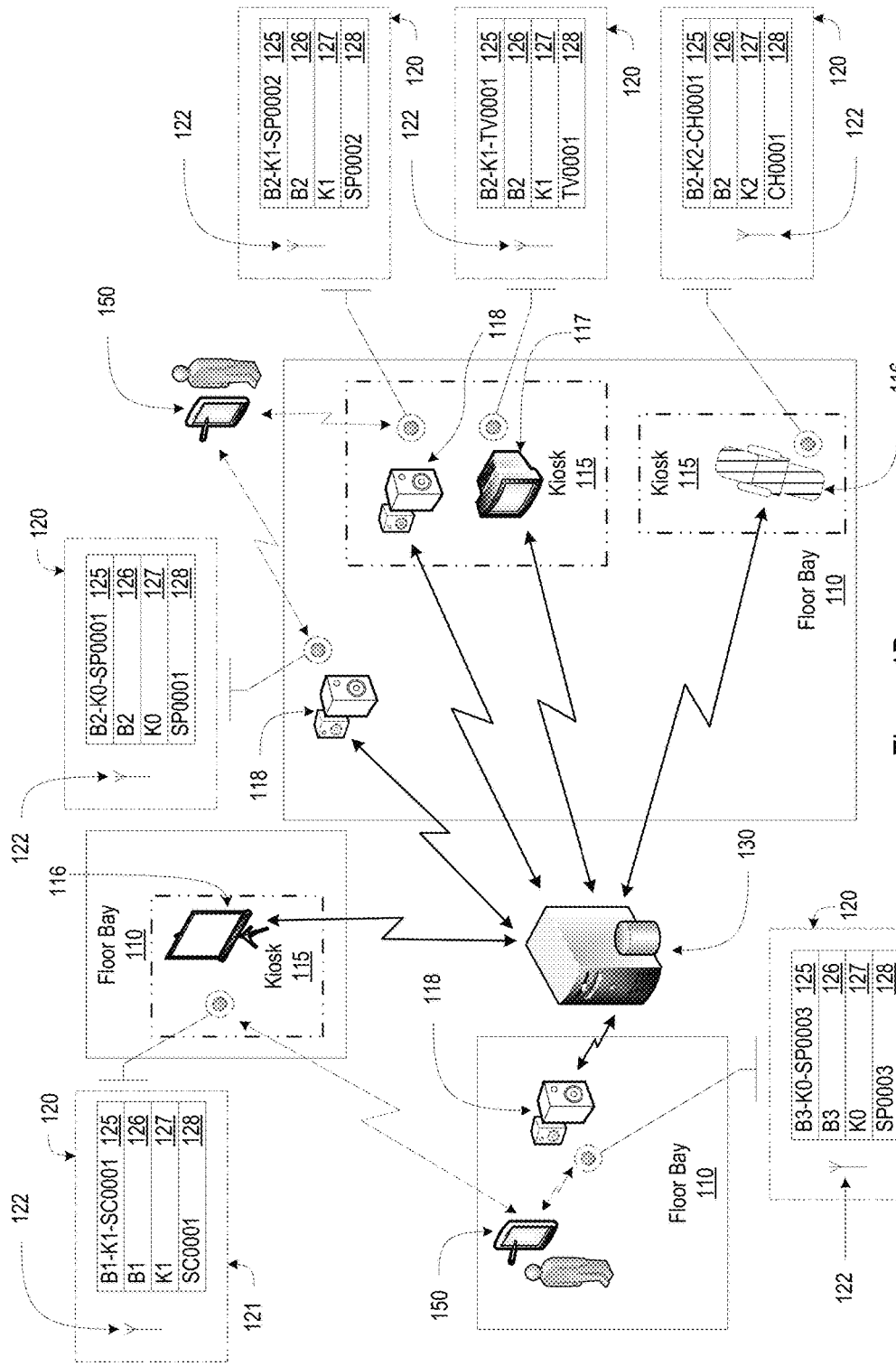
FIG. 1B provides an example architecture in which the current system may be deployed.

FIGS. 1A and 1B provide an example of a system 100 that may be deployed in a variety of environments, for example, the factory floor of a business innovation center, the floor of a conference center at a design exposition, or the like. For illustrative purposes, the system 100 may be described with reference to these different environments. As depicted in FIG. 1A, for example, the project floor 101 comprises different floor bays 110, in any or all of which a team may be developing or presenting a product according to any number of development and presentation roles assigned to one or more of the floor bays 110.

In one embodiment, the system 100 may help facilitate interaction between project managers and individual teams on the factory floor 101. As an example, the system 100 may help to push delivery metrics to project managers based on their location on the delivery floor 101. A project manager may make use of a hand held map display device 150 (FIG. 1B) as he walks across the factory floor 101 where the various project teams have been assembled. As the project manager passes a project floor bay 110, a location determination may be made of the handheld device 150 (either by the handheld device 150 itself, by a content server, by a location system in a floor bay 110, or by another entity) and receive decision support information and/or live metrics associated with those projects that are within his vicinity. This information may help to identify risks that the project manager may choose to act upon. As the project manager moves across the factory floor 101, his location will change and a new set of support information and metrics will be pushed to his device that is relevant to the new location (e.g., adjacent to a different floor bay 110).

As another example, the system 100 may facilitate interaction between clients moving on the project floor 101. In this context, the system 100 may help to showcase various business capabilities to the client based on their location on the showcase floor. By way of example, a client may use a handheld map display device 150 on an interactive tour of the factory floor 101 where various, in some cases interactive, project demonstrations may be arranged with which the client may interact. The handheld map display device 150 of the client may provide the client with a map of the factory 101 floor identifying the location of the various floor bays 110. The handheld map display device 150 may determine the location of the client, and as the client passes a project floor bay 110 the map display device 150, along with local content devices 116 in the floor bay 110, may welcome the client and present information related to the floor bay 110. This information may, for example, describe the stage of completion, the tools used, real success stories, and business expertise in related technologies and industries. The handheld map display device 150 may also provide the client with a map of the various kiosk or demonstration areas 115 within a floor bay 110. If the client approaches an information kiosk 115, the application will detect the client's proximity to the kiosk 115 and display a list of content related to that kiosk 115 on the handheld device 150. The content may facilitate interaction with the kiosk 115 and may take different forms, for example, audio or video content, or specialized content that may be processed and rendered by local content devices 116 at the kiosk 115. The client may be able to select content from the list for playback on local content devices 116 at the kiosk 115. The map display device 150 may also present the client with a map showing the location of different project managers to whom the client may reach out, or any other information.

The system 100 may help to facilitate the above described interactions, by allowing the handheld map display device 150 of a project manager or client to communicate with one or more application and content servers 130 (FIG. 1B), and a beacon network distributed across the project floor.

Distributed Beacon Network

The beacon network of the system 100 may include multiple personal area network (PAN) beacons 120, which may be distributed across a mapped region of the project floor 101. The beacons 120 themselves may include one or more PAN transmitters 122 that are capable of localized data transmission. The transmission may be a continuous low power broadcast. For example, the transmitter may be a Bluetooth 4.0 Smart technology, or Bluetooth low energy (BLE) transmitter. The Estimote Beacons available from Estimote, Inc. of New York, N.Y. are one example of a commercially available beacon that may implement the beacons 120. The beacons within the distributed beacon network may be in network communication with one another and/or in communication with a central server, for example, application and content servers 130.

The transmitters 122 may transmit or broadcast a beacon identifier 125 to handheld devices 150 in the vicinity. The beacon identifiers 125 for the beacons 120 may be programmed during their initial setup and installation, or they may be programmed while in operation. In some embodiments, the beacon identifiers 125 may be assigned by a central server, for example the application and content servers 130, or established in some other fashion. The beacon network 100 may also dynamically change as additional beacons 120 are introduced into the system 100 or when existing beacons 120 are removed from the system 100. For example, beacons 120 may be added to divide or split a large floor bay 110 into multiple areas, having different kiosks 115 and capabilities. Similarly, beacons 120 may be added to accommodate changes in the layout of a floor bay 110, for example, when adding or changing points of entry. The beacons 120 may also be removed from a certain floor bay 110 if they are no longer relevant to a particular context or are no longer needed to provide functionality.

In some embodiments, the beacon identifier 125 broadcast by the transmitters 122 of the beacons 120 may encapsulate unique identification information as well as group identification information. For example, the beacon identifier 125 may include a primary identifier 126 and a sub-identifier 127. The beacon identifier 125 may also include a unique device identifier 128.

As mentioned above, the beacons 120 may be distributed over a mapped region, for example, of the project floor 101. In some embodiments, the mapped project floor 101 may include one or more sub-regions. For example, the floor bays 110 may be thought of as sub-regions of the mapped project floor 101. Each floor bay 110 may have one or more beacons 120 placed within it, and the beacons within a floor bay 110 may be assigned a broadcast identifier 125 having a shared or common primary identifier 126. In this way, the one or more beacons 120 within a floor bay 110 may be associated with a sub-region of the mapped project floor 101. Each floor bay 110 may also include local content devices 116 associated with a respective beacon 120.

In some embodiments, the sub-regions may further include one or more sub-spaces. For example, a floor bay 110 may itself be quite large and may include one or more demonstration areas or kiosks 115 within it. Each kiosk 115 may include one or more beacons 120, which may be associated with local content devices 116 that are part of the kiosk 115. By way of example, a kiosk 115 may include local content devices 116 such as a TV 117 or a set of speakers 118 along with an associated beacon 120. As another example, the kiosk 115 may include a device with which the user may interact with, for example, a newly developed product like a massage chair. The beacons 120 may be assigned a broadcast identifier 125 having a sub-identifier 127 unique to the sub-space, for example, each kiosk 115 may have a unique sub-identifier 127 assigned to the local content devices 116 contained therein. In some embodiments, the broadcast identifier 125 may further include a unique device identifier 128 which may be associated with a specific device, a specific class of devices, or both.

Application and Content Servers

The system 100 may include application and content servers 130 (FIG. 1C) that the handheld device 150 may communicate with in order to facilitate interaction between the handheld device 150 and the system 100, including the floor bays 110 and kiosks 115. The application and content servers 130, for example, may provide web services (e.g., JSON, REST, SOAP, etc.) which the handheld device 150 may consume or interface with.

The application and content servers 130 may simultaneously facilitate interaction with multiple handheld devices 150 at different floor bays 110 and at different kiosks 115. The application and content servers 130 may make use of separate hardware or operate on the same hardware. For example, the application and content servers 130 may be hosted on a single server running separate virtual machines or virtual servers. In other embodiments, the application and content servers 130 may be dedicated servers. The application and content servers 130 may be located locally, remotely, or both locally and remotely. A server may refer to both the physical server hardware and the server software, which may include cloud computing systems or distributed computing environments as well as instances where "virtual servers" operate on physical hardware.

Figure 1C:
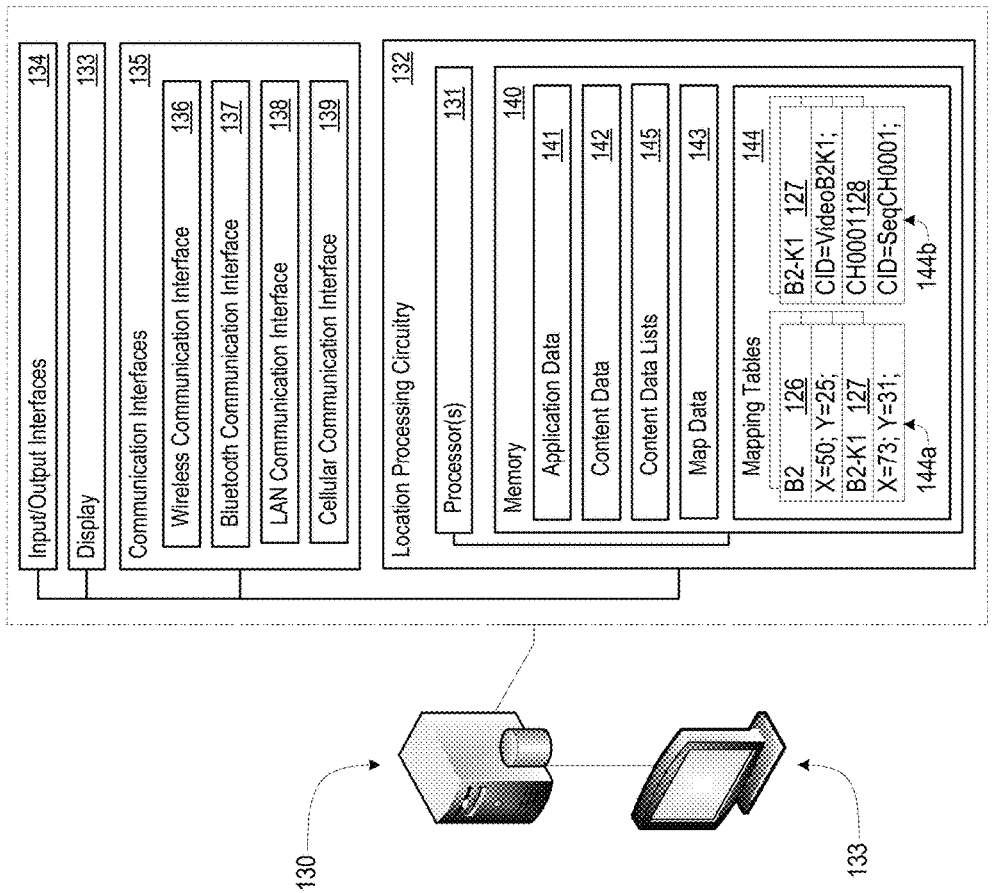
FIG. 1C provides an example of the hardware that may be used by the application and content servers.

FIG. 1C illustrates an example implementation of the application and content servers 130. The application and content server 130, for example, may include location processing circuitry 132 in communication with the communication interfaces 135. The location processing circuitry 132 may further include, for example, one or more processors 131 and a memory 140 in communication with the one or more processors 131.

The memory 140 may store various data sets including, for example and without limitation, application data 141, content data 142, map data 143, and mapping tables 144. The content server 130 may also include a display 133, input/output interfaces 134 and multiple communication interfaces 135. For example, the application and content servers 130 may include a WiFi communication interface 136, a Bluetooth communication interface 137, a LAN communication interface 138, and/or a cellular communication interface 139. In some embodiments, the application and content servers 130 may communicate with the handheld map display device 150 via the WiFi and/or LAN communication interfaces 136, 138. The communication may occur directly or indirectly, for example, through a series of routers or switches that are part of a wireless network infrastructure. The application and content servers 130 may communicate with beacons 120 within range via the Bluetooth communication interface 137 or any other of the interfaces 135.

The application and content servers 130 may provide the handheld device 150 with data in response to requests received from the handheld device 150. For example, the application and content servers 130 may provide application data 141, which the user may execute on the handheld device 150 to facilitate interaction between the handheld device 150 and the system 100. The application data 141 may be modular in nature allowing the handheld device 150 to request and load additional application data 141 in a segment fashion or on an on-demand basis once the base application data 141 has been loaded.

The application and content servers 130 may also provide the handheld device 150 with map data 143. The handheld device 150 may use the map data 143 to present the user with an interactive map with which the user may interact. By way of example, the map data 143 may contain a map representation of a mapped region of a project floor 101. As the mapped region of the project floor 101 may include one or more sub-regions and sub-spaces, the map data 143 may also include map representations for the different sub-regions and sub-spaces. The map data 143, for example, may contain map representations of the various floor bays 110 as well as map representations of the different kiosks and displays 115 therein.

In some embodiments, the application and content servers 130 may store map data 143 representing multiple different mapped regions corresponding to multiple different locations or factory floors. In situations where the application and content servers 130 are remotely located, for example, they may store map data 143 relating to a mapped region of a project floor 101 for, e.g., a San Francisco factory, and communicate with handheld devices 150 at the San Francisco factory. The application and content servers 130 may also include map data 143 corresponding to a conference center in Washington, D.C. that is hosting a design exposition, and communicate with handheld devices 150 therein.

The map data 143 may also contain map representations of the mapped region at different levels of detail, which may be more efficiently communicated and rendered at the handheld device 150. In some embodiments, for example, the map data 143 may contain map representations of a mapped region at different resolutions, which may be optimized for display on a particular type of handheld device display 200. This may also allow the hand held device 150 to more efficiently render a portion of the mapped region, for example, if the hand held device 150 is displaying a "zoomed" in view. In other embodiments, the map data 143 may contain map representations which may represent different layers of detail for a mapped region. For example, the map data 143 may group floor bays 110 or kiosks 115 based on common attributes (e.g., subject matter, those having interactive displays, etc.). The application and content servers 130 may be able to dynamically assemble and aggregate map data 143 for delivery to a handheld device 150. This may also facilitate delivery of map data 143 that is filtered based on certain parameters received in a message or request from a handheld device 150, or delivery of map data 143 on an on demand basis.

The application and content servers 130 may also store content data 142. In some embodiments, the content data 142 may take the form of audio data, video data or other data suitable for playback by a handheld device 150 or local content devices 116. In other embodiments, the content data 142 may include project information for a particular project or a project metric applicable to a particular project, which may be pushed to the user's handheld device 150. In some embodiments, the application and content servers 130 may store a reference to a remote location for the content, which the application and content servers 130 may retrieve. For example, the application and content servers 130 may store a uniform resource locator (URL) which may identify content that is available on the public Internet. The application and content servers 130 may retrieve and communicate the content to the handheld device 150.

In some embodiments, the application and content servers 130 may also allow the handheld device 150 to control the playback or method of display of the content data 142 on the handheld device or local content devices 116. The application and content servers 130, for example, may receive and process control commands from the handheld device 150. In response to the control commands, the application and content servers 130 may display or render content data 142 on the handheld device or the local content devices 116, individually or collectively. For example, the handheld device 150 may request that a demonstration video is played back on TV 117 and speakers 118.

The application and content servers 130 may further facilitate an immersive and interactive environment for the user of the handheld device 150. For example, the application and content servers 130 may provide for session and state management that may allow for greater interaction between the handheld device 150 and the local content devices 116. For example, the application and content servers 130 may allow the handheld device 150 to pause and resume a video. In some embodiments, the application and content servers may also provide responsive application data 141 to the handheld device 150, to further enhance playback. For example, the handheld device 150 may issue a control command to render a 3-D CAD model on a local content device 116. The application and content servers 130 may provide content data 142 in response, which the handheld device 150 may use to provide further interaction. For example, the application and content servers 130 may provide the handheld device 150 with content data 142 describing the 3-D model being rendered on the local content device 116. In some embodiments, the responsive content data 142 may include additional application data 141. Continuing with the previous example, the handheld device 150 may receive responsive content data 142 allowing the handheld device 150 to selectively enable or disable the rendering of certain CAD objects. The handheld device 150 may additionally, or alternatively, be able to select different views of the CAD model (e.g., front, top or isometric), or be allowed to otherwise manipulate the model (e.g., rotate or zoom) through a control interface sent to the handheld device 150.

The application and content servers 130 may also store mapping tables 144, which may include beacon mapping tables 144*a* and content mapping tables 144*b*. The beacon mapping tables 144*a* may also change as additional beacons 120 are added, or as existing beacons 120 are removed. The application and content servers 130 may provide these mapping tables 144 to the handheld device 150, for example, in response to a request from the handheld device 150. The application and content servers 130 may also provide mapping tables 144 to the handheld device 150 when the mapping tables 144 have changed, and may do so automatically or upon a request from the handheld device 150. In some embodiments, the beacon mapping tables 144*a* may contain information establishing a relationship or correspondence between a mapped sub-region or sub-space of a project floor 101 and the broadcast identifier 125 of a beacon 120. The relationship or correspondence may be based on different elements of the broadcast identifier 125 (e.g., primary identifier 126, sub-identifier 127, and unique device identifier 128). Similarly, the content mapping tables 144*b* may contain information linking content data 142 to a sub-region or sub-space of the project floor 101. The content data 142 may be location specific and unique to a sub-region or sub-space of a mapped region of the project floor 101. Additionally, or alternatively, the content data 142 may be device specific and unique to certain types of local content devices 116, for example, a TV 117 or speakers 118.

As an example, the handheld device 150 may place a request with a service running on the application and content servers 130 to return a beacon list by navigating to:

https://digitalgovernance.applicationserver.com

The application and content servers 130 may provide the following beacon mapping table 144*a* in response:

---

[{"id":1,"iBeaconID":"B9407F30-F5F8-466E-AFF9-5556B57FE6D","majorVersion":1,"minorVersion":400,"type":"TV","number":1,"locationx":1,"locationy":1},{"id":2"iBeaconID":"B9407F30-F5F8-466E-AFF9-25556B57FE6D","majorVersion":1,"minorVersion":500,"type":"TV","number":2,"locationx":2,

```
"locationy":2},{"id":3,"iBeaconID":"B9407F30-F5F8-466E-AFF9-
25556B57FE6D","majorVersion":1,"minorVersion":600,"type":"TV",
"number":3,"locationx":3,"locationy":3},{"id":4"iBeaconID":"B9407F30-
F5F8-466E-AFF9-25556B57FE6D","majorVersion":1,
"minorVersion":100,"type":"BAY","number":1,
"locationx":860,"locationy":90},{"id":5,
"iBeaconID":"B9407F30-F5F8-466E-AFF9-25556B57FE6D",
"majorVersion":1,"minorVersion":200,"type":"BAY","number":2,
"locationx":731,"locationy":318},{"id":6,"iBeaconID":"B9407F30-
F5F8-466E-AFF9-25556B57FE6D","majorVersion":1,
"minorVersion":300,"type":"BAY","number":3,"locationx":780,
"locationy":572}]
```

Location Processing Circuitry

As noted above, the servers 130 may include location processing circuitry 132, which may include any combination of hardware, software, firmware, or other logic. The location processing circuitry 132 may, for example, include one or more processors 131 and memories 140 in communication with the processors 131. The location processing circuitry 132 may determine the location of the handheld device 150 with respect to the project floor 101. The location processing circuitry 132, for example, may receive a location message from the handheld device 150, and may process the location message to determine a location of the handheld device 150 within a mapped region of the project floor 101. The location processing circuitry 132 may, for example, determine whether the handheld device 150 is within a particular sub-region or sub-space amongst the various mapped sub-regions and sub-spaces of the project floor 101. The location processing circuitry 132 may also make use of the beacon mapping tables 144a to match the handheld device 150 to a particular floor bay 110 or kiosk 115.

In some embodiments, the location message transmitted by the handheld device 150 may include one or more received beacon identifiers 125 along with their associated transmission parameters. The location processing circuitry 132 may process the location message to determine the location of the handheld device 150 within a mapped region of the project floor 101. For example, the location processing circuitry 132 may use the received beacon identifiers 125 and transmission parameters to approximate the distance from the handheld device 150 to the respective beacon 120. The location processing circuitry 132 may also allow the application and content servers 130 to use one or more received beacon identifiers 125 and their corresponding transmission parameters (e.g., frequency, bandwidth, power, Signal to Noise Ratio (SNR), signal strength) to triangulate, or otherwise determine, the location of the map display device 150. For example, the location processing circuitry 132 may make use of the beacon mapping tables 144a to correlate the received transmissions against known beacon relationships. In some embodiments, the location processing circuitry 132 may be further enhanced by using multiple received broadcast transmissions, which may improve the accuracy or precision of the location determination.

The location processing circuitry 132 may also receive and process different messages or requests from the handheld device 150 as the user interacts with the floor bays 110 and kiosks 115. The location processing circuitry 132 may, for example, receive a location message from the handheld device 150 indicating that it is within range, or entering, a floor bay 110. The location processing circuitry 132 may, in turn, communicate content data 142 to one or more local devices 116 associated with the floor bay 110. For example, the application and content servers 130 may transmit a personal audio welcome message, or an audio message inviting the user to enter the floor bay 110. The location processing circuitry 132 may also communicate content data 142 to be displayed on the handheld device 150. For example, location processing circuitry 132 may transmit a splash screen or presentation generally describing the floor bay 110. The content data 142 may be streamed to the local content devices 116 or handheld device 150 using any suitable streaming protocol. Additionally, or alternatively, the handheld device 150 and local content devices 116 may store the content data 142 locally for playback. In some embodiments, the location processing circuitry 132 may push decision support information and/or live metrics associated with the floor bay 110, or a summary of support information and metrics associated with the kiosks 115 therein.

The application and content servers 130 may also store the received location messages in memory 140, and may analyze the location messages to obtain analytics regarding the movement patterns of the user and the handheld device 150. The application and content servers 130 may use this information to provide information or notifications to the handheld device 150. The application and content servers 130, for example, may suggest floor bays 110 or kiosks 115 that the user may also like to visit. The application and content servers 130 may also leverage historical user preferences, or the movement patterns of other users to provide information or notifications to the handheld device 150.

In an exemplary embodiment, the handheld device 150 may place a request or transmit a location message for processing by a service running on the application and content servers 130 by navigating to:

https://digitalgovernance.applicationserver.com/bay/1

The location processing circuitry 132 may provide the following response:

```
{"id":1,"contentURL":"/static/
CMT_SFDC_Factory.pdf","audioClipURL":"/static/
Welcome_to_CMT_SFDC_Factory.mp3",
"zoomImageURL":"/static/Bay9.png","couponImageURL":null}
```

The location processing circuitry 132 may also receive and process content data list 145 requests from the handheld device 150. For example, the location processing circuitry 132 may receive a request for a list of content associated with a floor bay 110 or kiosk 115. The location processing circuitry 132 may make use of the request parameters along with the content mapping tables 144b to generate content data lists 145 which may be communicated to the handheld device 150. The content data 142 identified to be included in the content data list 145 may be based on a determined location of the handheld device 150 and/or based on a matched floor bay 110 or kiosk 115. As previously noted, the content data 142 may be location specific and mapped to a particular sub-region or sub-space. In this way, the location processing circuitry 132 may identify content data 142 that is specific to the floor bay 110 or kiosk 115 that the map display device 150 is located at. The content data list 145 may further identify content data 142 capable of being displayed on the handheld map display device 150 or played back at the local content devices 116 of the kiosk 115 or floor bay 110. The content data list 145 may include additional parameters regarding the underlying content data 142, for example, a description of the content data 142 and associated technical details (e.g., content type, size, and duration).

In an exemplary embodiment, the handheld device 150 may place a request for a content data list 142 capable of playback on a TV 117 at a kiosk 115 by navigating to:

https://digitalgovernance.applicationserver.com/tv/1

The location processing circuitry 132 may provide the following content data list 145 in response:

```
[{"contentid":1,"tvid":1,"name":"content 400-1","description":"content
400-1 description","thumbnailURL":"/static/Video1.png","duration":100,
"filename":"C:\\DigitalFloorVideos\\CMT_eCommerce_Factory.mov"},
{"contentid":2,"tvid":1,"name":"content 400-2","description":"content
400-2 description","thumbnailURL":"/static/Video2.png","duration":100,
"filename":"C:\\DigitalFloorVideos\\CMT_eCommerce_Factory.mov"},
{"contentid":3,"tvid":1,"name":"content 400-3","description":"content
400-3 description","thumbnailURL":"/static/Video3.png","duration":100,
"filename":"C:\\DigitalFloorVideos\\CMT_eCommerce_Factory.mov"},
{"contentid":4,"tvid":1,"name":"content 400-4","description":"content
400-4 description","thumbnailURL":"/static/Video1.png","duration":100,
"filename":"C:\\DigitalFloorVideos\\CMT_eCommerce_Factory.mov"}]
```

The location processing circuitry 132 may also receive and process a selection message from the map display device 150, requesting playback or delivery of content data 142. In some embodiments, the content data 142 selection message received by the location processing circuitry 132 may specify delivery to the handheld device 150 or delivery to the local content devices 116. Furthermore, as discussed earlier, the handheld device 150 may, in some embodiments, be able to further control the playback and rendering of the content data 142 on the handheld device 150 or local content devices 116. In such embodiments, the request for content data 142 may also include a request to initiate or establish a playback session for the selected media content.

In other embodiments, the location processing circuitry 132 may forgo generating and communicating a list to the handheld device 150, and may retrieve location specific content data 142 mapped to a particular sub-region or sub-space and push the location specific content data 142 to a handheld device 150 or local content device 116 for display or playback. For example, the location processing circuitry 132 may determine that the handheld device 150 is within particular floor bay 110 or at a specific kiosk 115. The location processing circuitry 132 may use content mapping tables 144b to match and retrieve project information for a particular project associated with the identified floor bay 110 or kiosk 115. Similarly, the location processing circuitry 132 may use content mapping tables 144b to match and retrieve project metrics applicable to a particular project associated with a given floor bay 110 or kiosk 115. The content data 142 may be dynamically updated and continuously pushed to the handheld device 150, or pushed to the handheld device 150 at set intervals. The handheld device 150 may also be able to modify the update interval.

In an exemplary embodiment, the handheld device 150 may request playback of a particular video by navigating to:

https://digitalgovernance.applicationserver.com/player/1/play

Application and Content Server Logic

Figure 8:
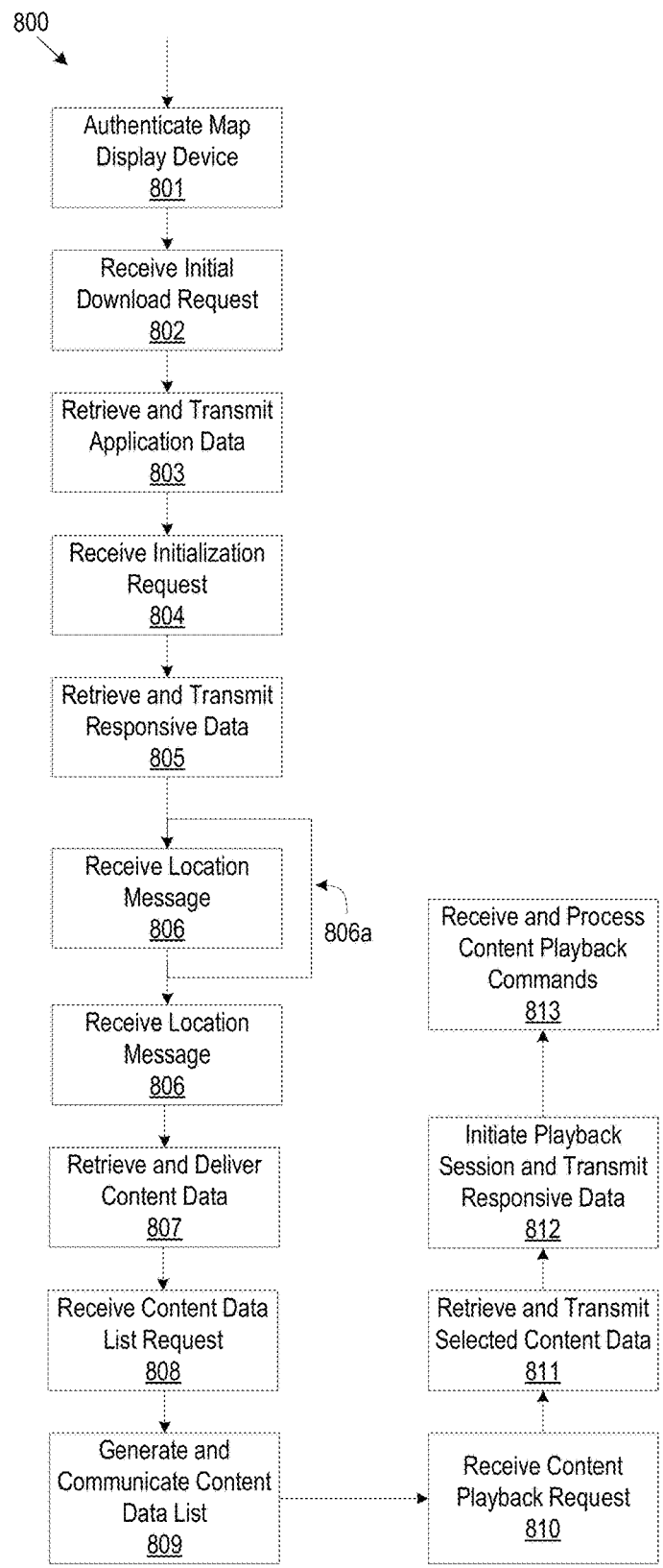
FIG. 8 illustrates example logic that may be implemented in the application and content servers.

FIG. 8 provides an illustrative example of the operation of the application and content servers 130, describing exemplary server logic 800 that may be employed by the processor 131 and memory 140 of the application and content servers 130. The server logic 800 may implement an authentication procedure before the handheld map display device 150 may make use of the services provided by the application and content servers (801).

The server logic 800 may receive an initial download request from the handheld map display device 150 (802). The server logic 800 may process the request and retrieve and transmit application data 141 to the map display device 150 (803). For example, in embodiments where the application data 141 is modular in nature, the server logic 800 may transmit the core or essential application data 141 to the map display device 150.

The server logic 800 may also receive an initialization request from the handheld map display device 150 (804). As previously described, the server logic 800 may process the request and retrieve additional application data 141, content data 142, map data 143, or mapping tables 144 and transmit the responsive data to the map display device 150 (805). In servicing the request, the server logic 800 may use parameters identified in the request (e.g., device or operational parameters and user selected parameters) along with the beacon and content mapping tables 144a, 144b, to selectively retrieve the responsive data for transmission to the handheld device 150.

The server logic 800 may also receive location information messages from hand held map display device 150 as the user moves about the system environment (806). For example, as described above, the application and content servers 130 may receive location messages as the map display device 150 moves within range of a floor bay 110. The server logic 800 may continually receive and process location information messages, and may fork separate processes to handle one or more incoming requests (806a). In response, the server logic 800 may retrieve and deliver content data 142 to the handheld device 150 and/or local content devices 116 associated with the floor bay 110, for example, by delivering a welcome message and general information regarding the floor bay 110 (807).

In some embodiments, the server logic 800 may also receive a request for a content data list 145 from the hand held device 150 (808). The server logic 800 may make use of parameters included in the request along with the content mapping tables 144b in memory 140 to generate a list of content data 145. The server logic 800 may, in turn, communicate the generated content data list 145 to the hand held device 150 (809).

The server logic 800 may then receive a content playback request from the hand held device 150, which may include control commands requesting delivery of content data 142 presented on the content data list 145 (810). In response to the playback request, the server logic 800 may retrieve and transmit the identified content data 142 to the handheld device 150 and/or the local content devices 116 (811). The content data 142 may be streamed to the local devices 116 or handheld device 150 for playback. In embodiments where additional playback control is desired, the server logic 800 may also initiate a playback session and transmit responsive data to the hand held device 150 (812). As an example, the responsive data transmitted to the handheld device 150 may include information regarding the playback session along with additional application data 141 modules providing additional functionality for the handheld device 150. Once a playback session has been initiated, the server logic 800 may await additional playback control commands, which the server logic may receive and process (813).

Handheld Map Display Devices

Figure 2:
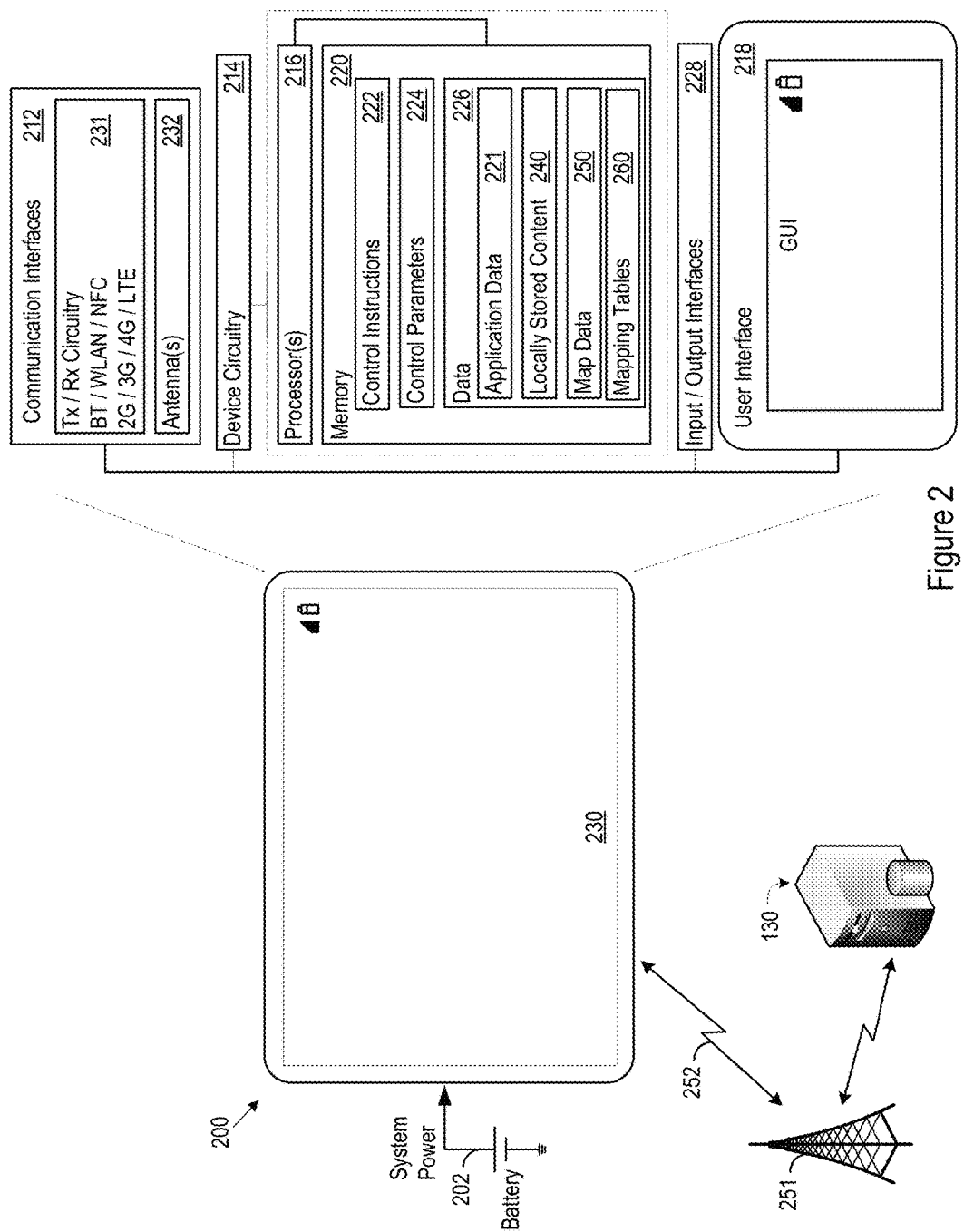
FIG. 2 provides an example of the hardware that may be used by the hand held map display device.

The system 100 may include one or more handheld map display devices 150, 200. FIG. 2 provides an example implementation of the map display device 200. The map display device 200 is a portable tablet in this example, but the map display device 200 may be any electronic device. As one example, the map display device 200 may be a 2G, 3G, or 4G/LTE cellular phone capable of making and receiving wireless phone calls, and transmitting and receiving data using 802.11a/b/g/n/ac/ad ("WiFi"), Bluetooth (BT), Near Field Communications (NFC), or any other type of wireless technology. The map display device 200 may also be a smartphone that, in addition to making and receiving phone calls, runs any number or type of applications. The map display device 200 may, however, be virtually any device that transmits and receives information, including as additional examples an emergency transponder, a pager, a portable satellite television receiver, a laptop computer system, a tablet, a portable multimedia player, a music player, or virtually any other device.

FIG. 2 shows an example of the map display device 200 in communication with a network controller 251, which may facilitate communication between the map display device 200 and the application and content servers 130.

The map display device 200 includes communication interfaces 212, device logic 214, and a user interface 218. The device logic 214 may include any combination of hardware, software, firmware, or other logic. The device logic 214 may be implemented, for example, with one or more systems on a chip (SoC), application specific integrated circuits (ASIC), discrete analog and digital circuits, and other circuitry. The device logic 214 is part of the implementation of any desired functionality in the map display device 200. In that regard, the device logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218.

The user interface 218 and the input/output (I/O) interfaces 228 may include a graphical user interface, touch sensitive display, voice or facial recognition inputs, buttons, switches, speakers and other user interface elements. Additional examples of the I/O interfaces 228 include microphones, video and still image cameras, temperature sensors, vibration sensors, rotation and orientation sensors, headset and microphone input/output jacks, Universal Serial Bus (USB), Serial Advanced Technology Attachment (SATA), and Peripheral Component Interconnect express (PCIe) interfaces and connectors, memory card slots, radiation sensors (e.g., IR or RF sensors), and other types of inputs. The I/O interfaces 228 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The device logic 214 may include one or more processors 216 and memories 220. The memory 220 stores, for example, control instructions 222 that the processor 216 executes to carry out desired functionality for the map display device 200. The control parameters 224 provide and specify configuration and operating options for the control instructions 222. The memory 220 may also store any BT, WiFi, 3G, or other data 226 that the map display device 200 will send, or has received, through the communication interfaces 212.

In the communication interfaces 212, Radio Frequency (RF) transmit (Tx) and receive (Rx) circuitry 231 handles transmission and reception of signals through one or more antennas 232.

The memory 220 may store various additional elements including, for example and without limitation, application data 221 for interfacing with the system 100, locally stored content 240, one or more sets of map data 250, and one or more mapping tables 260.

Figure 6:
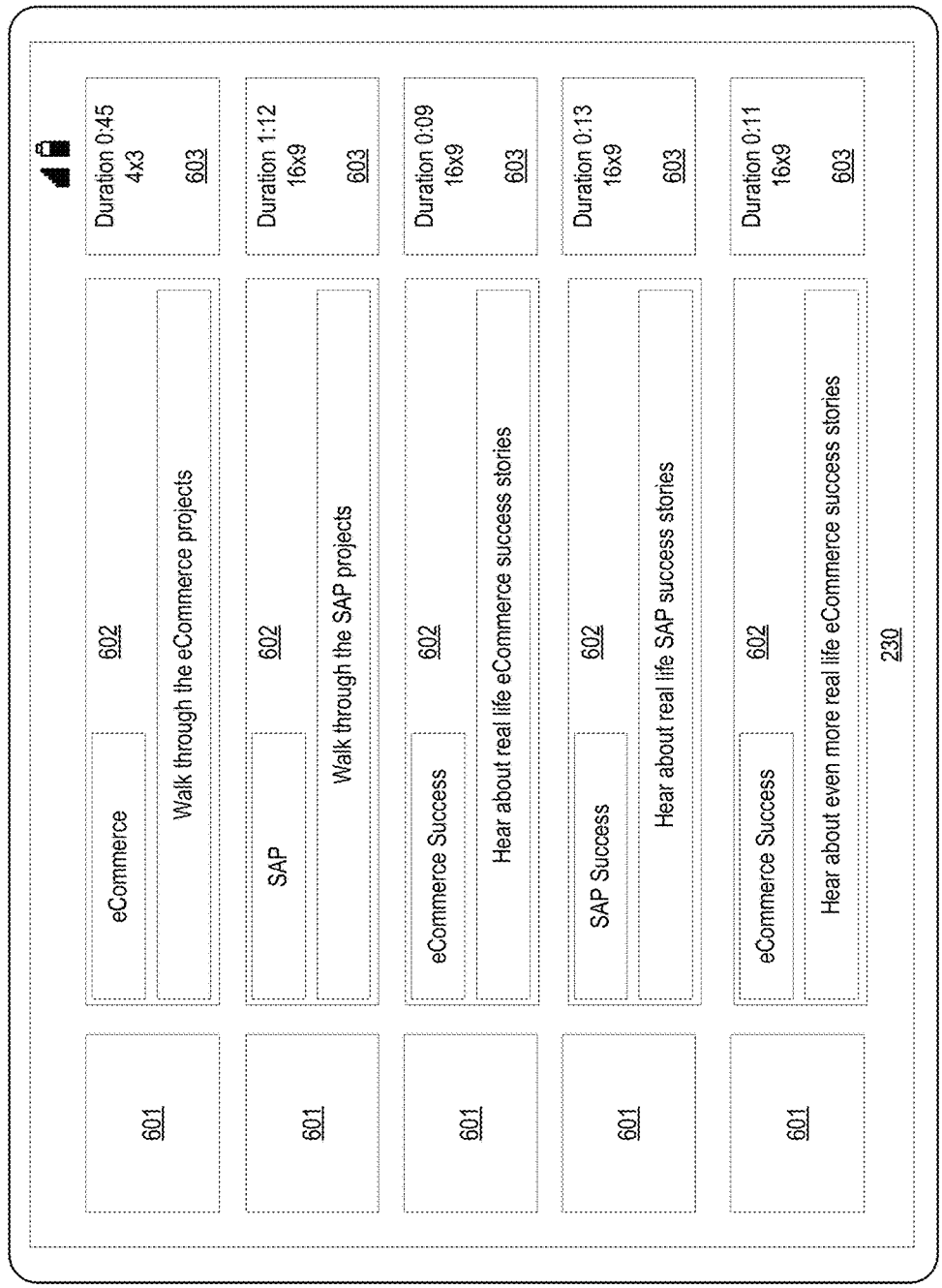
FIG. 6 illustrates an example interface rendered on the hand held map display device, showing a view of a mapped sub-space of the project floor.
Figure 7:
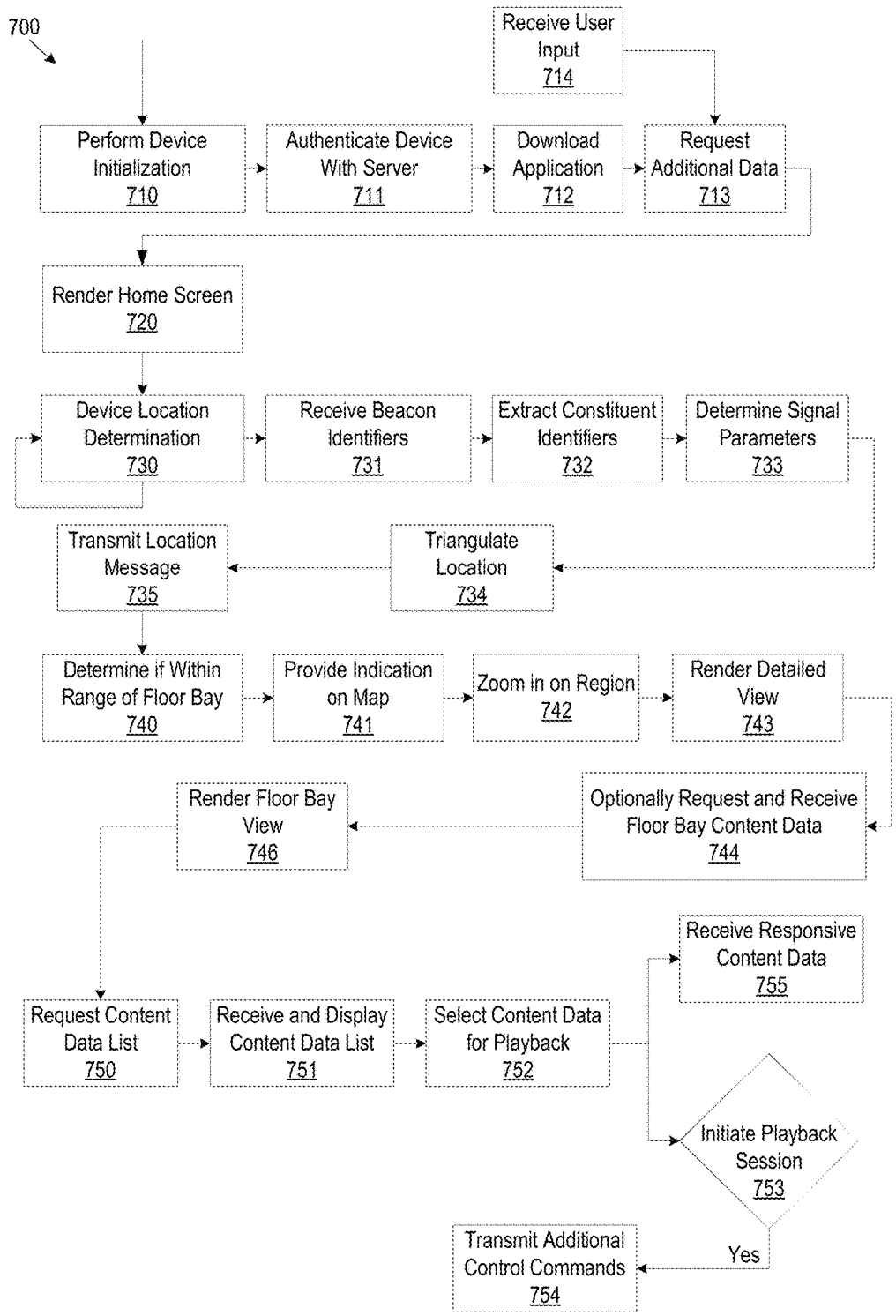
FIG. 7 illustrates example logic that may be implemented in the hand held map display device.

The operation of the handheld device 200 will be described with reference to FIG. 7 which illustrates one example of the device logic 214, 700 that may be employed by the handheld device 200. FIGS. 3-6 provide additional context, providing illustrative instances of an application interface 201 rendered on the display 230 of the handheld device 200.

Device Initialization Logic

In some embodiments, the device logic 700 may perform an initialization or start-up procedure in which the processor 210 is directed to retrieve, e.g., initialization data for operation (710). The device logic 700 may communicate with the application and content servers 130, which may service different requests from the map display device 200. The device logic 700 may, for example, authenticate itself with the application and content servers 130 (711) and make a request to download application data 141 (712) that may enable some of the functionality described below. The device logic 700 may, for example, request data (e.g., application data 141, content data 142, map data 143, or mapping tables 144) from the application and content servers 130 (713). In some embodiments, the data request may allow the map display device 200 to pre-load data that would be used during operation of the map display device 200. The device logic 700, for example, may request different beacon mapping tables 144a, 260, which the device logic 700 may store in memory 220. Following device initialization, the device logic 700 may request updated beacon mapping tables 144a, 260, which may have changed with the addition or removal of one or more beacons 120. The device logic 700 may make the request periodically, along with other requests, or in response to a notification provided by the application and content servers 130. The beacon mapping table 260, as described previously, may include one or more links or relationships between the beacon identifier 125 of the one or more PAN beacons 120 and a mapped region, sub-region, or sub-space. The link or relationship may be based on a primary identifier 126, sub-identifier 127, or unique device identifier 128.

The device logic 700 may also allow the map display device 200 to preferentially load the data when a high speed data connection is available, which the map display device 200 may not be available, or available at diminished speeds, when operating the map display device 200, for example, on the project floor. The request may include device or operational parameters which the application and content servers 130 may use to select the data that may be communicated in response. For example, the device logic 700 may communicate that the map display device 200 is operating in a certain project floor environment.

The device logic 700 may also prompt the user during the process to determine what data may be desired (714). The device logic 700, for example, may prompt the user to select certain application data 141 modules, which the user may select based on anticipated interactions with the floor bays 110 or kiosks 115.

The device logic 700 may also request content data 142 from the application and content servers 130 which may be stored as local content 240. In such cases, the user of the map display device 200 may be prompted to select desired content types. Additionally, or alternatively, the retrieved content data 142 may be specific to the map display device 200, for example, based on the capabilities of the device. As another example, the retrieved content data 142 may be specific to the environment in which the map display device 200 is to operate. The device logic 700 may also retrieve the map data 143 and mapping tables 144 related to the environment in which the map display device 200 is to operate.

Figure 3:
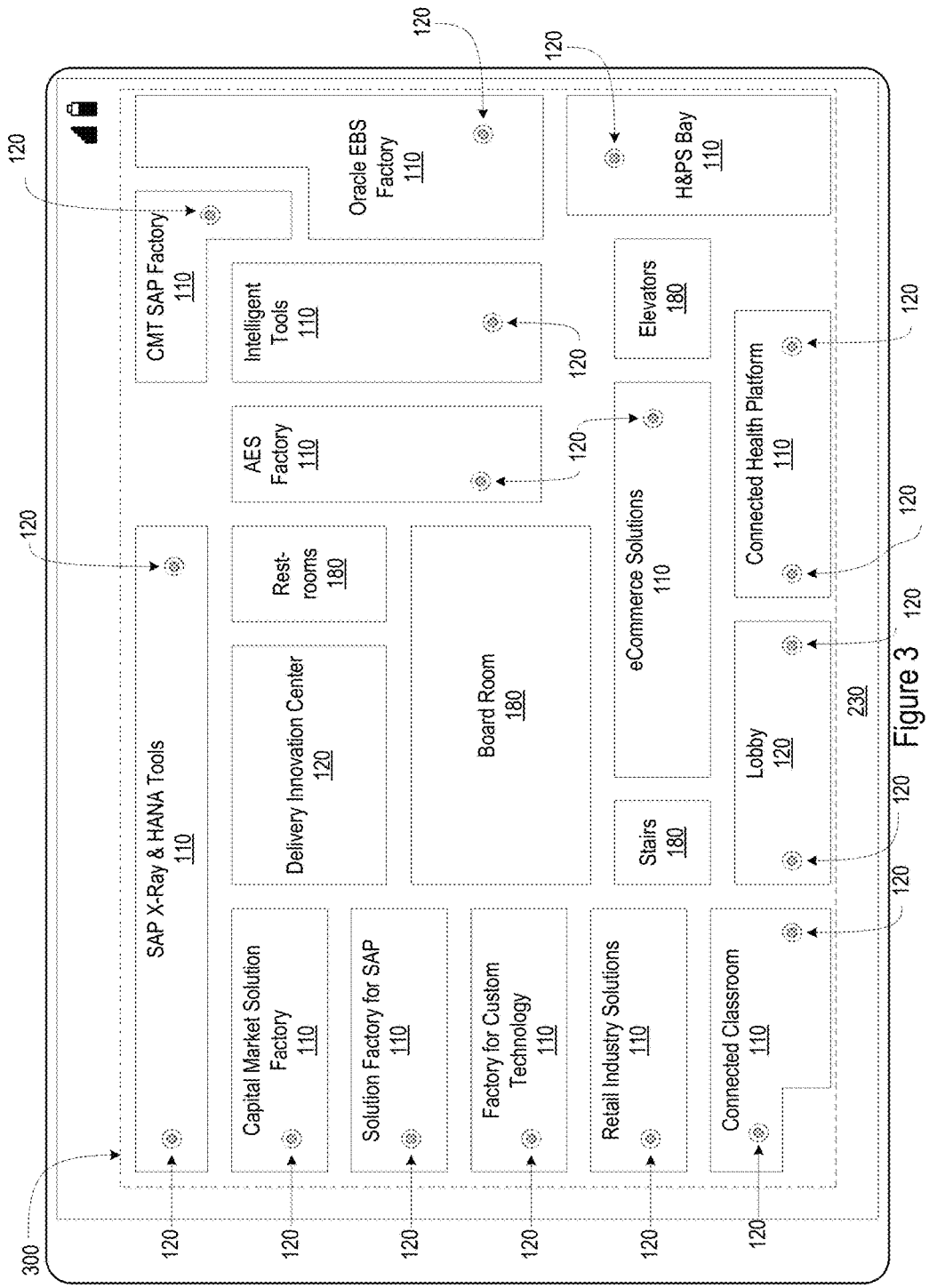
FIG. 3 illustrates an example of an interface rendered on the hand held/map display device, showing an initial view of a mapped region.

As illustrated in FIG. 3, the device logic 700 upon initialization may render a home screen on the display 230 of the map display device 200 (720). The device logic 700 when first launched may render a map representation of a mapped region 300, which may further define mapped sub-regions 110 and mapped sub-spaces therein. For example, the device logic 700 may display a map representation of the entire project floor 300 using map data 250 stored in memory 220. The map rendered 300 on the display 230 may delineate different areas on the project floor, in varying levels of detail. For example, the map 300 may include various floor bays 110 along with general areas 180 of the project floor (e.g., stairwells and escalators, bathrooms, and conference rooms). The device logic 700 may also make use of mapping tables 260 (e.g., beacon mapping tables 260) to determine which of the floor bays 110 may include beacons 120. The device logic 700 may, in turn, display a beacon indicator 330 on those regions of the map 300.

Location Determination Logic

The device logic 700 may also determine the location of the map display device 200 (730). As described previously, the beacons 120 of the distributed beacon network may be continuously transmitting a beacon identifier 125. When within range, the device logic 700 may receive the beacon identifier 125 signals, which the device logic 700 may process to determine the current location of the map display device 200 (731). The device logic 700 may also extract the primary identifier 126 and sub-identifier 127 from the beacon identifier 125 (732). The device logic 700 may also process the received transmission to determine various signal parameters (e.g., frequency, bandwidth, power, Signal to Noise Ratio (SNR)) (733). For example, the device logic 700 may use the signal parameters to approximate a distance from the beacon 120 to the handheld device 200. The device logic 700 may further determine which received transmission has the greatest signal strength.

The device logic 700 may also make use of the determined signal parameters and signal strength to discriminate between the received transmissions. For example, the device logic 700 may apply a minimum threshold below which the received transmissions are not considered relevant for location determination purposes. As another example, in situations where the map display device 200 is within range of more than one floor bay 110 or kiosk 115, the device logic 700 may use the signal parameters and determined signal strength to select the kiosk 115 or floor bay 110 which the map display device 200 will interface with. The device logic 700 may also use the determined signal parameters and signal strength to triangulate the location of the map display device 200 (734). In some embodiments, for example, the device logic 700 may make use of the beacon mapping tables 260 to correlate the received transmissions against known beacon relationships. The device logic 700 may be capable of determining the location relative to the entire mapped region (e.g., project floor 101), a sub-region (floorbay 110), or a sub-space (kiosk 115). In some embodiments, the location determination logic 700 may be further enhanced by using multiple received broadcast transmissions, which may, for example, improve the accuracy or precision of the location determination. The above described location determination may also be performed, in part or in whole, by the application and contents servers 130. The device logic 700 may transmit the current determined location of the handheld device 200 in a location message to the application and content servers 130 (735).

In some implementations, the beacons 120 continuously transmit their beacon identifiers 125, and the device logic 700 may continuously determine and update the location of the map display device 200. For example, in operation of the map display device, the user may physically move from one location to another on the floor. As the user approaches a floor bay 110 where a beacon 120 is installed, the device logic 700 may determine the location of the map display device 200. The device logic 700 may also provide an indication on the rendered map 300 indicating the current location of the map display device 200. In this way, the map display device 150 may facilitate navigation of the factory floor by the user. However, in other implementations, the beacons 120 transmit and/or the device logic 700 determine location updates at specific times or at specific intervals, e.g., once per second.

System Interaction Logic

Figure 4:
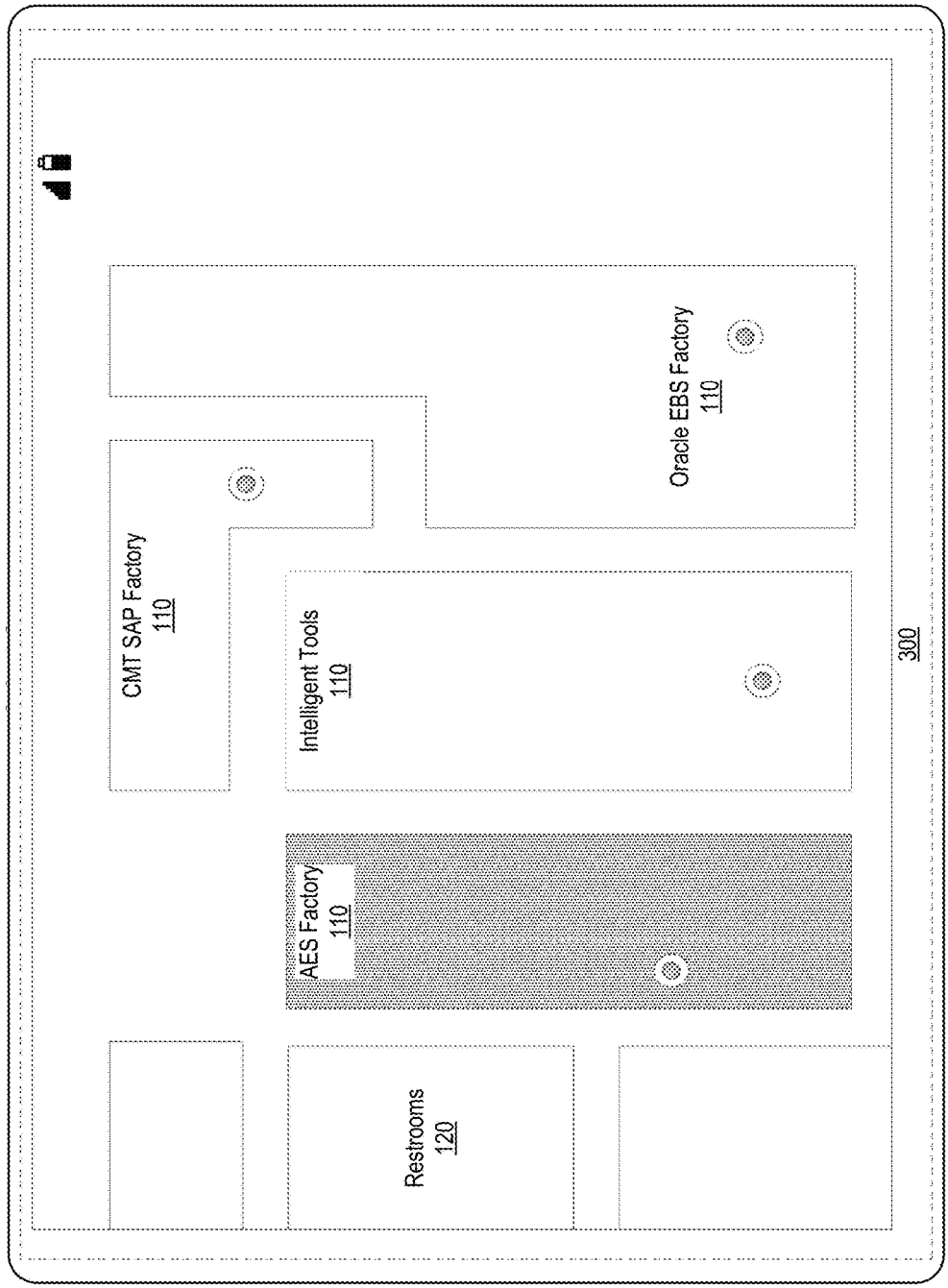
FIG. 4 illustrates an example interface rendered on the hand held map display device, showing a zoomed in view of the mapped region of the project floor.

The device logic 700 may also determine when the map display device 200 moves within range of a floor bay 110 having beacons 120 installed therein (740). The device logic 700 may provide an indication on the rendered map 300, for example, by making the particular floor bay 310 glow or flash (741). With reference to FIGS. 3 and 4, for example, the user may move from the floor bay 110 labeled "Intelligent Tools" to the floor bay 110 labeled "AES Factory," and in response the device logic 700 may display a glowing indicator for the region labeled "AES Factory." In addition to making the floor bay 310 glow or flash, the device logic 700 may also "zoom" in on a portion of the rendered map 300 (742). The device logic 700 may zoom in on this portion automatically, upon a delay, or based on the selection of the user. This may be accomplished, for example and without limitation, by scaling the image, re-rendering a portion of the digital floor at a higher resolution, or by using map data of a sub-region which may provide a greater level of detail.

The device logic 700 may also provide the user with a detailed view (743). The device logic 700 may present the detailed view on the display 230 of the map display device 200 automatically, upon delay, or based on user input. The device logic 700 may load locally stored content 240 or may request content data 142 from the application and content servers 130 to be displayed on the display 230 of the map display device 200 (744). The device logic 700 may, for example, request a slideshow, providing additional details and information regarding the project, to display 230 on the map display device 200.

In some embodiments, the application and content servers 130 may transmit content data 142 without a request, in response to the transmitted location message. For example, the application and content servers 130 may present the handheld device 150 with an invitation to participate in a workshop or demonstration taking place in a nearby floor bay 110 or kiosk 115. In other embodiments, the application and content servers 130 may transmit a calendar of upcoming deliverables, appreciation emails that the team received, or content highlighting the accomplishments of the team. The device logic 700 may also communicate the presence of the map display device 200 at a floor bay 110 to the application and content servers 130 in a location message, which may trigger the playback of content data 142 on local content devices 116 at the floor bay 110. For example, the user of the map display device 200 may approach a floor bay 110, and the speakers 117 installed at the floor bay 110 may begin playing a "Welcome" audio track.

Figure 5:
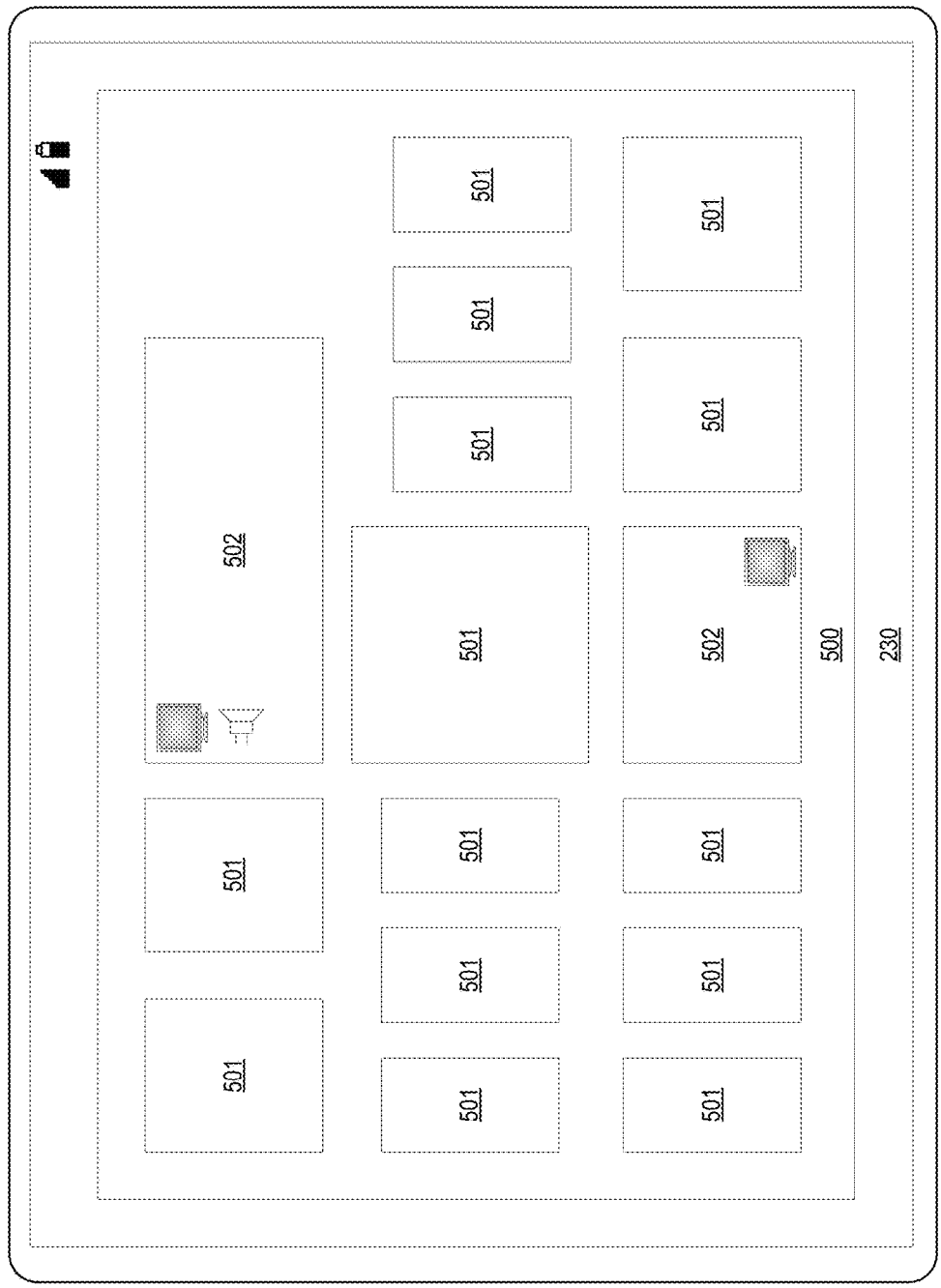
FIG. 5 illustrates an example interface rendered on the hand held map display device, showing a view of a mapped sub-region of the project floor.

With reference to FIG. 5, the device logic 700 may also provide the map display device 200 with a bay view, which may provide a detailed map of the floor bay 110 (746). The device logic 700 may allow the user to switch between the detailed view and the bay view. As illustrated in FIG. 5, the device logic 700 may display a bay view which may delineate various sub-spaces 501 and kiosks 502 within a floor bay 500. The device logic 700 may make use of beacon mapping tables 260 to identify and display the various sub-spaces 501 and kiosks 502 in the floor bay 500. As seen in FIG. 5, the bay view identifies a series of sub-spaces 501 and a pair of kiosks 502. The device logic 700 may also make use of the beacon mapping tables 260 to determine the type of indication that should be rendered on the display 230 of the map display device 200. For example, the kiosks 502 may be identified with an icon (e.g. a television icon) representative of the local content devices 116 present at a kiosk 115.

The device logic 700 may further recognize when the map display device 200 is within range of a particular kiosk 115 in the floor bay 110, and may request a list of content data 142 (e.g., media content) associated with the kiosk 115 from the application and content servers 130 (750). The request may include information regarding the capabilities of the map display device 200 (e.g., screen resolution, hardware specifications, and haptic feedback abilities). In some embodiments, the device logic 700 may allow a user to selectively request content data 142 (e.g., by providing the user with selective content filters). For example, the device logic 700 may allow the user to filter the content data 142 list by content data 142 type or by completion status (i.e., whether the content data 142 has been previously viewed).

In response to the request, the device logic 700 may receive a list of content data 142 from the application and content servers 130, which may be applicable to the current location (e.g., sub-space or kiosk 115) of the map display device 200. The device logic 700 may display the list of content data 142 on the display 230 of the map display device 200 (751). As illustrated in FIG. 6, the list of content data 142 on the map display device 200 may include a visual representation 601 of the content data 142 (e.g., a thumbnail image of the content data 142), identification and descriptive information 602 for the content data 142 elements (e.g., title and summary), and technical information 603 regarding the content data 142 elements (e.g., length, size, duration, etc.). In some embodiments, the content data list corresponding to a kiosk 115 may be obtained from the application and content servers 130 during the initialization procedure.

The device logic 700 may allow the user to select a content data 142 (e.g., media content) element for playback from the list (752). The device logic 700 may communicate the selection to the application and content servers 130, which may facilitate playback of the content data 142 on the local content devices 116 of the kiosk 115. In some embodiments, the device logic 700 may facilitate further control over the playback of the content data 142 on local content devices 116 by initiating a playback session with the application and content servers 130 (753). The device logic 700 may also issue playback commands to the application and content servers 130 based on user input at the map display device 200. For example, the user may be able to pause, fast-forwarded, or otherwise interact with the content data 142 being rendered on the local content devices 116 (754). The device logic 700 may also receive content data 142 in response to the selection (755), which may include additional application data 141 modules, which may allow the map display device 200 to manipulate the playback of the content data 142 on the local content devices 116. As an example, a user of the map display device 200 may select playback of a 3-D model, which may be rendered at local content device 116. The device logic 700 may receive application data 141 modules that allow the user to manipulate the 3-D model, for example, adjusting the elements displayed or changing the orientation of the displayed model. The system 100, thus, may allow the map display device 200 to interface with a diverse variety of local content devices 116. As another example, the kiosk 115 may demonstrate a new chair design 116, which may be adjustable in different orientations or may provide a massage feature. The content data 142 list may provide the option to adjust the chair into different orientations or instruct the chair to perform a massage sequence. In response to selecting playback of a massage sequence, the device logic 700 may receive application data 141 modules that allow the user to manipulate the massage sequence, for example, by increasing the speed or intensity.

While some of the provided examples describe device logic 700 that automatically presents the user with different views (e.g., a view of the entire floor, a zoomed in view of a portion of the map, a detailed view, a view of the floor bay), it is also contemplated that the device logic 700 may allow the user to manually select, change, or navigate through these different views. Furthermore, in some embodiments, the device logic 700 may selectively provide the content data 142 list. For example, the content data list may only be presented to the map display device 200 if it is within range of the kiosk 115 and/or if the map display device 200 is in a particular mode or view, for example, in the bay view.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
 a beacon network of personal area network (PAN) beacons distributed over a mapped region, the PAN beacons comprising PAN transmitters configured to locally transmit beacon identifiers assigned to the PAN beacons; and
 a content server comprising:
  a memory comprising:
   a map representation for the mapped region, the map representation defining mapped sub-regions within the mapped region;
   a mapping table establishing a correspondence between the beacon identifiers and the mapped sub-regions;
   a content mapping that links location specific content with the mapped sub-regions, wherein the location specific content comprises a list of media content available for playback for the particular sub-region, wherein the media content comprises at least one of audio content or video content;
  a communication interface configured to communicate with the mapped sub-regions and with a separate map display device; and
  location processing circuitry coupled to the memory, the location processing circuitry configured to:
   receive a location message from the map display device;
   process the location message to determine a location of the map display device within the mapped region;
   match the location to a particular sub-region among the mapped sub-regions;
   retrieve selected location specific content mapped to the particular sub-region; and
   communicate the selected location specific content to the map display device.

2. The system of claim 1, where the location processing circuitry is further configured to:
 receive a media content selection from the map display device; and
 communicate media content corresponding to the media content selection to the particular sub-region.

3. The system of claim 2, where the beacon identifiers comprise:
 a sub-identifier unique to sub-space within the particular sub-region.

4. The system of claim 3, where the beacon identifiers comprise:
 a primary identifier shared among multiple of the PAN beacons that are located in the particular sub-region.

5. The system of claim 1, where:
 the location processing circuitry is further configured to respond to a content list request for media content associated with the particular sub-region.

6. The system of claim 1, where the location processing circuitry is further configured to:
 receive a media content selection from the map display device; and
 communicate media content corresponding to the media content selection to the map display device.

7. The system of claim 6, where the beacon identifiers comprise:
 a sub-identifier unique to sub-space within the particular sub-region.

8. The system of claim 7, where the beacon identifiers comprise:
 a primary identifier shared among multiple of the PAN beacons that are located in the particular sub-region.

9. A method comprising:
 storing a map representation of a mapped region, the map representation defining mapped sub-regions within the mapped region;
 defining a mapping table that establishes a correspondence between beacon identifiers and the mapped sub-regions;
 creating a content mapping that links location specific content with the mapped sub-regions;
 receiving a location message from a separate map display device;
 processing the location message to determine a location of the map display device within the mapped region;
 determining a particular sub-region among the mapped sub-regions at which the map display device is located;
 retrieving selected location specific content mapped to the particular sub-region, wherein the location specific content comprises a list of media content available for playback for the particular sub-region, wherein the media content comprises at least one of audio content or video content; and
 communicating the selected location specific content to the map display device.

10. The method of claim 9, where the beacon identifiers comprise:
 a sub-identifier unique to sub-space within the particular sub-region.

11. The method of claim 10, where the beacon identifiers comprise:
 a primary identifier shared among multiple of the PAN beacons that are located in the particular sub-region.

12. The method of claim 10, further comprising:
 receiving a media content selection from the map display device; and
 communicating media content corresponding to the media content selection for the particular sub-space.

13. A product comprising:
 a memory other than a transitory signal; and
 instructions stored on the memory for execution by an instruction processor, the instructions configured to cause the instruction processor to:
  display a map representation of a mapped region, the map representation defining mapped sub-regions within the mapped region and mapped sub-spaces within the sub-regions;

store a mapping table comprising:
- a link between personal area network (PAN) beacon primary identifiers and the mapped sub-regions; and
- a link between PAN beacon secondary identifiers and the mapped sub-spaces;

receive beacon identifiers;

determine a current location within the mapped region responsive to receiving the beacon identifiers and based on the mapping table;

communicate the current location to a content server in a location message;

receive from the content server a media content list applicable to the current location, wherein the media content comprises at least one of audio content or video content;

accept a media selection from the media content list; and communicate the media selection to the content server.

14. The product of claim 13, where the instructions are further configured to cause the instruction processor to:
determine a particular sub-space of a particular sub-region as the current location; and
receive, as the media content list, a media content list applicable to the particular sub-space.

* * * * *